United States Patent [19]

Takahashi et al.

[11] Patent Number: 4,606,197
[45] Date of Patent: Aug. 19, 1986

[54] COMPRESSOR CONTROL UNIT FOR AUTOMOBILE AIR CONDITIONER

[75] Inventors: Tadahiro Takahashi; Shinji Sutoh, both of Konan, Japan

[73] Assignee: Diesel Kiki Co., Ltd., Tokyo, Japan

[21] Appl. No.: 711,209

[22] Filed: Mar. 13, 1985

[30] Foreign Application Priority Data

Mar. 22, 1984 [JP] Japan ............................. 59-41077[U]

[51] Int. Cl.⁴ .............................................. B60H 1/32
[52] U.S. Cl. ........................................ 62/133; 62/161; 62/228.5
[58] Field of Search ................. 62/133, 161, 163, 239, 62/243, 244, 230, 323.4, 228.5, 196.2; 165/42, 43, 25

[56] References Cited

U.S. PATENT DOCUMENTS 4,485,634 12/1984 Yasuda et al. ...................... 62/196.2
4,487,029 12/1984 Hidaka et al. .......................... 62/133
4,510,764 4/1985 Suzuki .................................. 62/133

FOREIGN PATENT DOCUMENTS 57-54411 11/1982 Japan .
195884 12/1982 Japan .

*Primary Examiner*—Harry Tanner
*Attorney, Agent, or Firm*—Wenderoth, Lind & Ponack

[57] ABSTRACT

In a compressor control unit for an automobile air conditioner, there are provided an economizer switch, an acceleration detector, an electromagnetic clutch, a discharge adjuster and a control circuit whereby, based on signals from both the economizer switch and the acceleration detector, the control circuit controls the electromagnetic clutch and the discharge adjuster so as to obtain an optimum condition relative to both an air conditioning feeling and a driving ability of the automobile.

6 Claims, 2 Drawing Figures

COMPRESSOR CONTROL UNIT FOR AUTOMOBILE AIR CONDITIONER

BACKGROUND OF THE INVENTION

1. Field of the Invention:

The present invention relates to an improvement of a compressor control unit for an automobile air conditioner, having a compressor which is used for compressing a refrigerant.

2. Description of the Prior Art:

In an automobile air conditioner, a compressor thereof is driven by an automobile engine. Consequently, an additional load is applied to the engine by the compressor to cause poor driving characteristics.

In an attempt to overcome the above problem, it has been proposed that the driving of the compressor be controlled, for example, such a control is performed by a control unit disclosed in Japanese Laid-open application No. 195884/1982; such a control unit is provided with an acceleration detector which detects an acceleration of the automobile and to stop the driving of the compressor or to reduce an amount of the discharge of the compressor by 50% so as to improve the driving performance.

Furthermore, for accomplishing the same purpose as noted above, in Japanese Utility Model Publication No. 54411/1982, proposes the provision of an economizer switch for enabling a driver to select an ordinary driving mode or an economical driving mode so that, when he selects the economical driving mode, a temperature limit above which the compressor is actuated is set for a high level so as to decrease the operating ratio of the compressor whereby an energy saving is attempted.

However, in one of the former cases where the driving of the compressor is stopped, since the driving of the compressor is stopped at a time when the automobile is being accelerated even if cooling of the passenger compartment is required, it is not possible to obtain a suitable cooling condition whereby a cooling feeling is impaired. This is a defect inherent in one of the former cases.

In the other of the former cases where the discharge of the compressor is reduced by 50%, since the driving of the compressor is continued when the cooling of the passenger compartment is required, the defect inherent in one of the former cases is eliminated. However, in this the other case, since the driving of the compressor is still continued even when the cooling of the passenger compartment is not necessarily required, it is not possible to increase the acceleration capability of the automobile sufficiently. This is a defect inherent in the other of the former cases.

In the latter case, since the temperature limit is merely set for a high or a low level by means of the economizer switch, the driving of the compressor is continued even when the automobile is accelerated so as to impair the acceleration capability of the automobile. This is a defect inherent in the latter case.

SUMMARY OF THE INVENTION

It is the first object of the present invention to provide a compressor control unit for an automobile air conditioner, which may prevent the air conditioning feeling from being impaired.

It is the second object of the present invention to provide a compressor control unit for an automobile air conditioner which may improve the driving performance of an automobile.

It is the last object of the present invention to provide a compressor control unit for an automobile aie conditioner which may effect on energy saving.

For accomplishing these objects, the present invention provides a compressor control unit for an automobile air conditioner comprising: an economizer switch for selecting an ordinary driving mode or an economical driving mode; an acceleration detector for detecting an acceleration of the automobile; an electromagnetic clutch for disconnectably connecting a driving shaft of the compressor to an automobile engine for travel; a discharge adjusting means for adjusting an amount of the discharge of the compressor; and a control circuit for issuing its output signals as control signals: one of the control signals is fed to the discharge adjusting means to enable the means to have the compressor discharge a large amount of refrigerant in the case where signals from both the economizer switch and the acceleration detector are received by the control circuit to confirm that the ordinary driving mode is selected by the economizer switch and where the acceleration detector detects no acceleration of the automobile; another of the control signals from the control circuit is fed to the discharge adjusting means to enable the means to have the compressor discharge a small amount of the refrigerant in the case where the ordinary driving mode is selected by the economizer switch and an acceleration of the automobile is detected by the acceleration detector, or in the case that the economical driving mode is selected and the acceleration detector detects no acceleration; and other control signals from the control circuit are fed to the electromagnetic clutch to enable the clutch to disconnect the driving shaft of the compressor from the automobile engine in the case where the economical driving mode is selected by the economizer switch and an acceleration of the automobile is detected by the acceleration detector.

Consequently, according to the present invention, it is possible to accomplish the first, the second and the last object of the present invention in that: in the case where the ordinary driving mode requiring a sufficient cooling capacity is selected and it is permitted to apply an additional load to the automobile engine at a time when the automobile is not accelerated, it is possible to increase an amount of the discharge of the compressor so that a sufficient cooling capacity may by obtained; and in the case where that the ordinary driving mode requiring a sufficient cooling capacity is selected and at a time when the automobile is accelerated during which time it is not possible to apply an additional load to the automobile engine, it is possible to reduce the amount of the discharge of the compressor so that the acceleration ability of the automobile may be increased to some extent while the air conditioning feeling is kept in good condition; and in the case where the economical driving mode is selected and a sufficient cooling capacity is not required and at a time when the automobile is not accelerated, it is possible to reduce the amount of the discharge of the compressor so that unnecessary energy-loss is eliminated; and, in the case where the economical driving mode is selected and a sufficient cooling capacity is not required and at a time when the automobile is accelerated during which it is not possible to apply an additional load to the automobile engine, it is possible to disconnect the driving shaft of the compressor from the automobile engine so as to make it possible for the full engine power of the automobile to be utilized to accelerate the automobile.

DESCRIPTION OF THE PREFERRED EMBODIMENT

Hereinbelow, an embodiment of the present invention will be described with reference to the accompanying drawings.

Figure 1:
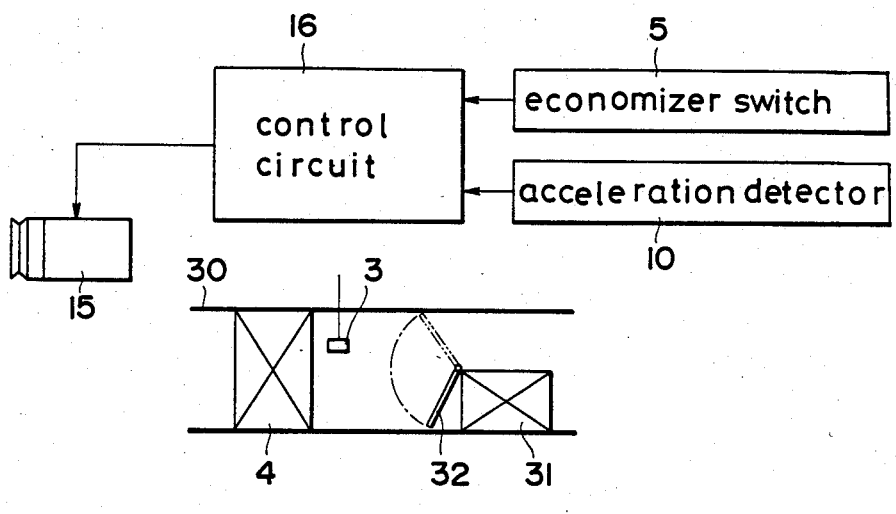
FIG. 1 is a block diagram of the outline of the compressor control unit of the present invention, showing the signal flow and the air conditioner thereof.
Figure 2:
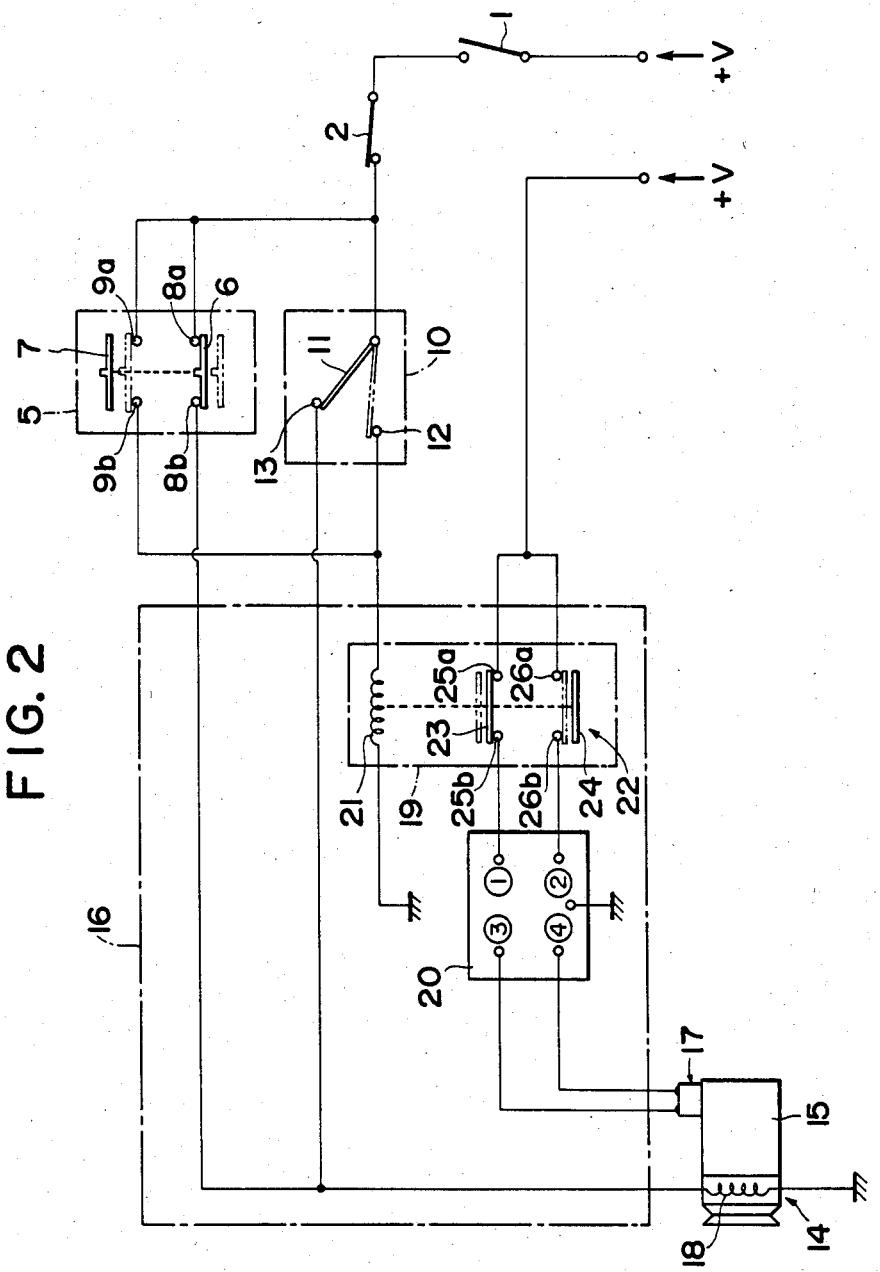
FIG. 2 is a circuit diagram of the compressor control unit which is the embodiment of the present invention.

In FIGS. 1 and 2, which FIG. 1 shows an outline of the signal flow and the air conditioner, which is the gist of the present invention, as a block diagram; an automobile air conditioner is provided with a compressor 15 for compressing a refrigerant; the compressor 15 is rotatably driven by an automobile engine and constitutes a part of a refrigerating circuit together with an evaporator 4 disposed within an air conditioner case 30 in which is also disposed a heater core 31 in which a coolant from the automobile engine is introduced; in front of the heater core 31 is disposed an air mixing door 32 for adjusting an amount of a cooled air which has passed through the evaporator 4 and which is directed to the heater core 31; the cooled air which has been cooled by the evaporator 4 is mixed with a hot air heated by the heater core 31 at a suitable ratio to obtain an adequately warmed air. The automobile air conditioner has the above-mentioned construction. The reference numeral 3 designates a temperature detector for preventing freezing, which is disposed downstream of the evaporator 4 and which feeds its output signal to a thermo-switch.

In such automobile air conditioner, the compressor 15 for compressing the refrigerant is controlled to take any one of a large discharge operational mode, a small discharge operational mode and a stoppage mode; the control of the compressor 15 is performed by processing the detected signals from the economizer switch 5 for selecting the ordinary driving mode or the economical driving mode and from the acceleration detector 10 for detecting the acceleration of the automobile, by means of a control circuit 16.

In FIG. 2, there is shown the embodiment of the present invention, in which an air conditioner switch 1 is connected in series to the thermo-switch 2. The thermo-switch 2 is operated in an on-off manner by means of the temperature detector 3 to prevent the evaporator 4 from being frozen, and is opened when the environmental temperature becomes below 0 to 3 degrees Centigrade.

The economizer switch 5 for selecting the ordinary driving mode or the economical driving mode is a double-pole single-throw switch having one pole which is used as a normally closed contact 6 and having a pole which is used as a normally open contact 7. A contact 8a of fixed contacts 8a, and 8b which the normally closed contact 6 is brought into contact with is connected to the thermo-switch 2, and the other contact 8b of fixed contacts 8a and 8b is connected to an electromagnetic clutch 14. On the other hand, a contact 9a of fixed contacts 9a, and 9b which the normally open contact 7 is brought into contact with is connected to thermo-switch 2, and the other contact 9b of fixed contacts 9a and 9b is connected to a relay coil 21 of a relay 19 which will be described later. The economizer switch 5 is so operated that it is switched to a position shown by a solid line in FIG. 2 when the ordinary driving mode is selected while it is switched to the other position shown by a two-dot chain line in FIG. 2 when the economical driving mode is selected; the economizer switch 5 is disposed in an instrument panel in a driver room together with the air conditioner switch 1 and is operated manually in general.

An acceleration detector 10 for detecting an acceleration of the automobile is connected in series to the thermo-switch 2 connected in parallel and to the economizer switch 5; the detector 10 is constructed of a single-pole double-throw switch having a movable contact 11 of which is connected to the thermo-switch 2, one and having one fixed contact 13 of fixed contacts 12 and 13 of which is connected to the electromagnetic clutch 14, and having another fixed contact 12 of fixed contacts 12, and 13 which is connected to the relay coil 21 of the relay 19.

The acceleration detector 10 detects an acceleration of the automobile based on an air pressure (negative pressure) in an intake pipe of the automobile engine, and is so constructed that when it detects no acceleration (the negative pressure at this time is higher than a prescribed value) of the automobile, the movable contact 11 is connected to the fixed contact 13 as shown by the solid line in FIG. 2, and that when it detects an acceleration of the automobile (the negative pressure is lower than the prescribed value), the movable contact 11 is connected to the the fixed contact as shown by the two-dot chain line in FIG. 2. Incidentally, in contrast with this embodiment of the acceleration detector 10, it is possible to link the acceleration detector 10 to an accelerator pedal so that the movable contact 11 is moved by a downward stroke of the accelerator pedal.

The electromagnetic clutch 14 for disconnectably connecting the automobile engine to the driving shaft (not shown) of the compressor 15 is operated by the energizing/de-energizing of its coil 18 using of the control signal output from a control circuit 16 which will be described later.

The discharge adjusting means 17 for adjusting an amount of the discharge of the compressor 15 is constructed of an electromagnetic solenoid which is employed, for example, in a swash-plate type of compressor 15 to change an angle of the swash-plate thereof as disclosed in Japanese Laid-open application No. 94107/1979, or in a vane type of the compressor 15 to change the number of its effective vanes as disclosed in Japanese Laid-open application No. 97138/1976; the discharge quantity adjusting means 7 is also operated by the control signal output from the control unit 16 described later to change an amount of the discharge of the compressor 15.

The control circuit 16 is so constructed that: both the fixed contact 8a of the economizer switch 5 and the fixed contact 13 of the acceleration detector 10 are connected to a coil 18 of the electromagnetic clutch 14; in the case where the economical driving mode is selected by the economizer switch 5 and the acceleration condition of the automobile is detected, the coil 18 of the electromagnetic clutch 18 is not energized to put the compressor 15 in its idle condition, and in any other case except the above case, the coil 18 of the electromagnetic clutch 14 is energized to put the compressor 15 in its working condition.

In addition to the above, the control circuit 16 is provided with the relay 19 and a logic circuit 20, the relay 19 is constructed of the relay coil 21 and a switch 22 operated by this relay coil 21.

The coil 21 of the relay 19 is connected to one of the fixed contacts 9a of the normally open contacts of the economizer switch 5 and to the other of the fixed contacts 12 of the acceleration detector 10. The switch 22 of the relay 19 is constructed of a double-pole single-throw switch having one pole which is used as a normally closed contact 23 and having another pole is used as a normally open contact 24. When the economical driving mode is selected, or when the acceleration of the automobile is detected by the acceleration detector 10, the normally closed contact 23 of the switch 22 of the relay 19 disconnects the fixed contact 25a from the fixed contact 25b while the normally open contact 24 connects the fixed contact 26a to the fixed contact 26b.

In the logic circuit 20, a terminal ① is connected to the fixed contact 25a of the normally closed contact 23 of the switch 22 and a terminal ② is connected to the fixed contact 26b of the normally open contact 24, while both terminals ③ and ④ are connected to the discharge adjusting means 17. When a voltage is applied to the terminal ①, a control signal for a large amount of discharge is supplied to the discharge adjusting means 17 through the terminal ③, while another control signal for a small amount of discharge is supplied to the discharge adjusting means 17 through the terminal ④ when a voltage is applied to the terminal ②.

In the above construction, the compressor control unit is operated as shown in the following Table, an operation of which unit will be hereinbelow described with reference to the Table:

In the case where the air conditioner switch 1 is turned on and the ordinary driving mode is selected by the economizer switch 5 while no acceleration of the automobile is detected by the acceleration detector 10, the fixed contacts 8a and 8b are connected to each other and the movable contact 11 is connected to one of the fixed contacts 13. Consequently, the coil 18 of the electromagnetic clutch 14 is energized so that the compressor 15 is actuated while the coil 21 of the relay 19 is not energized to make it possible for the discharge of the compressor 15 to be large so as to exert the maximum cooling capability of the compressor 15.

When no acceleration is detected by the acceleration detector 10 and the economical driving mode is selected by the economizer switch 5, two movable contacts of the economizer switch 5 are turned off and the normally open contact 7 is closed. Consequently, the coil 21 of the relay 19 is energized to operate the switch 22 so that the discharge of the compressor 15 becomes small so as to prevent unnecessary energy-loss.

In the case where the ordinary driving mode is selected and the acceleration of the automobile is detected by the acceleration detector 10, the movable contact 11 is connected to the other fixed contact. Consequently, the discharge of the compressor 5 becomes small as is in the above case so that the acceleration ability of the automobile is increased to some extent while the air conditioning feeling is kept in a good condition.

When the economical driving mode is selected and the acceleration of the automobile is detected by the acceleration detector 10, the normally open contact 7 of the economizer switch 5 is closed and the movable contact 11 of the acceleration detector 10 is connected to the other fixed contact. Consequently the coil 18 of the electromagnetic clutch 14 is not energized to put the compressor 15 in its idle condition (not driven) so that the acceleration ability of the automobile is exerted to its maximum extent without substantially impairing the air conditioning feeling.

TABLE

| detected condition by acceleration detector | (discharge of the compressor) economizer switch selection | |
|---|---|---|
| | ordinary driving mode | economical driving mode |
| no acceleration condition | large amount | small amount |
| accelaration condition | small amount | zero |

What is claimed is:

1. A compressor control unit for an automobile air conditioner comprising:
    an economizer switch for selecting an ordinary driving mode or an economical driving mode;
    an acceleration detector for detecting an acceleration of said automobile;
    an electromagnetic clutch for disconnectably connecting an automobile engine to a driving shaft of said compressor;
    a discharge adjusting means for adjusting an amount of a discharge of said compressor;
    a control circuit for issuing its outputs as control signals: one of said control signals is fed to said discharge adjusting means to enable said means to have said compressor discharge a large amount of refrigerant in a case where signals from both said economizer switch and said acceleration detector are received by said control circuit to confirm that the ordinary driving mode is selected by said economizer switch and where the acceleration detector detects no acceleration of said automobile; another of said control signals from said control circuit is fed to said discharge adjusting means to enable said means to have said compressor discharge a small amount of said refrigerant in a case where said ordinary driving mode is selected by said economizer switch and an acceleration of said automobile is detected by said acceleration detector, or in a case where the economical driving mode is selected and said acceleration detector detects no acceleration; and other of said control signals from said control circuit are fed to said electromagnetic clutch to enable said clutch to disconnect said driving shaft of said compressor from said automobile engine in a case where said economical driving mode is selected by said economizer switch and an acceleration of said automobile is detected by said acceleration detector.

2. The compressor control unit for the automobile air conditioner as set forth in claim 1, wherein:
    said economizer switch is a double-pole single-throw switch having one pole which constructs a normally closed contact and another other pole which constructs a normally open contact.

3. The compressor control unit for the automobile air conditioner as set forth in claim 1, wherein:
    said economizer switch is disposed in an instrument panel and operated manually.

4. The compressor control unit for the automobile air conditioner as set forth in claim 1, wherein:

said acceleration detector is a single-pole double-throw switch and is operated based on an air pressure in an intake pipe of said automobile engine.

5. The compressor control unit for the automobile air conditioner as set forth in claim 1, wherein: said acceleration detector is operated according to a downward stroke of an accelerator pedal.

6. The compressor control unit for the automobile air conditioner as set forth in claim 1, wherein: said discharge adjusting means is changeable into at least two stages for a large amount and a small amount of said discharge of said compressor.

* * * * *